United States Patent
Studer et al.

(10) Patent No.: US 10,661,201 B2
(45) Date of Patent: *May 26, 2020

(54) FROTH COALESCING

(71) Applicant: Hewlett-Packard Development Company, L.P., Houston, TX (US)

(72) Inventors: Anthony Studer, Corvallis, OR (US); Robert Wickwire, Corvallis, OR (US); John Farrar Wilson, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/093,447

(22) PCT Filed: Jul. 11, 2016

(86) PCT No.: PCT/US2016/041713
§ 371 (c)(1),
(2) Date: Oct. 12, 2018

(87) PCT Pub. No.: WO2018/013072
PCT Pub. Date: Jan. 18, 2018

(65) Prior Publication Data
US 2019/0126170 A1    May 2, 2019

(51) Int. Cl.
*B41J 2/175* (2006.01)
*B01D 19/00* (2006.01)
(Continued)

(52) U.S. Cl.
CPC ........ *B01D 19/0042* (2013.01); *B01D 19/00* (2013.01); *B01D 19/0031* (2013.01);
(Continued)

(58) Field of Classification Search
None
See application file for complete search history.

(56) References Cited

U.S. PATENT DOCUMENTS 6,562,107 B2    5/2003    Purdom et al.
6,746,106 B1*   6/2004    Hager ................... B41J 2/1404
                                                        347/47
(Continued)

FOREIGN PATENT DOCUMENTS

RU      1215207 A       10/1990
RU      2450848 C2      5/2012

*Primary Examiner* — Erica S Lin
(74) *Attorney, Agent, or Firm* — HP Inc. Patent Department

(57) ABSTRACT

An example device includes a frame having at least one outer opening and at least one inner opening recessed from the outer opening, at least one filter screen mounted on a perimeter of the at least one inner opening to form an inner chamber, at least one cover layer mounted on a perimeter of the at least one outer chamber to form an outer chamber, and a series of bubblebreaking features positioned within the inner chamber. The bubble-breaking features are positioned along a depth and a height of the inner chamber. The filter screen separates the inner chamber from the outer chamber, and the filter screen prevents froth from crossing and allows coalesced fluid to cross into the outer chamber.

15 Claims, 3 Drawing Sheets

(51) Int. Cl.
*B01D 36/00* (2006.01)
*B01D 19/02* (2006.01)
*B01D 29/05* (2006.01)
*B41J 2/19* (2006.01)

(52) U.S. Cl.
CPC ............ *B01D 19/02* (2013.01); *B01D 29/05* (2013.01); *B01D 36/001* (2013.01); *B01D 36/003* (2013.01); *B41J 2/175* (2013.01); *B41J 2/17563* (2013.01); *B41J 2/17566* (2013.01); *B41J 2/19* (2013.01)

(56) References Cited

U.S. PATENT DOCUMENTS

| | | |
|---|---|---|
| 7,273,275 B2 | 9/2007 | Buchanan et al. |
| 7,449,051 B2 | 11/2008 | Olsen |
| 8,678,576 B2 | 3/2014 | Edombingo et al. |
| 2005/0247198 A1 | 11/2005 | Kent |
| 2006/0061637 A1* | 3/2006 | Therien .................... B41J 2/175 347/84 |
| 2006/0090645 A1* | 5/2006 | Kent ................... A61M 1/1658 95/46 |
| 2007/0006735 A1* | 1/2007 | Olsen ................. B01D 19/0031 96/188 |
| 2010/0053286 A1 | 3/2010 | Ito |
| 2010/0079559 A1 | 4/2010 | Justice et al. |
| 2015/0183228 A1* | 7/2015 | Paschkewitz .............. B41J 2/19 347/92 |

\* cited by examiner

FROTH COALESCING

BACKGROUND

Froth is a common occurrence in many fluids. Froth is a mass of bubbles in a fluid, or on the surface of the fluid. Froth can form as air is incorporated into the fluid. For example, in ink printing systems, as air is introduced into an ink reservoir to maintain pressure, froth may form in the corpus of the ink or on a surface of the ink. Froth is also found in other fluids, for example detergents or liquid soaps. Such froth may inhibit the operations of a system that processes fluids that are susceptible to froth formation

BRIEF DESCRIPTION OF THE DRAWINGS

For a more complete understanding of various examples, reference is now made to the following description taken in connection with the accompanying drawings in which.

DETAILED DESCRIPTION

Figure 1:
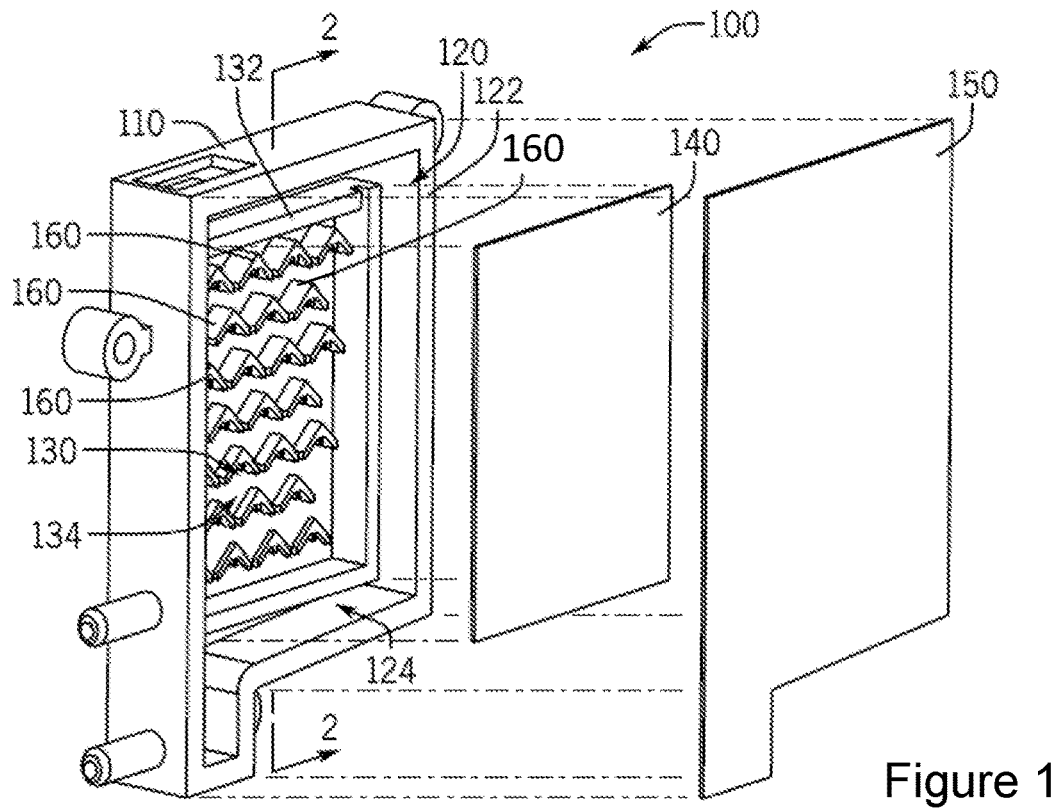
FIG. 1 is an exploded, perspective view of an example defrothing device.

Various examples described herein provide for coalescing of fluid in a froth. In one example, a device receives a froth, as may be formed in a fluid such as ink, and separates the froth into a coalesced fluid and air. The coalesced fluid may be collected and re-circulated to a fluid reservoir, such as an ink supply, and the air may be vented to the atmosphere. In one example, an example device is formed of a frame having an inner chamber into which froth may be directed and an outer chamber for receiving the coalesced fluid. The inner chamber is defined at least in part by a filter screen mounted on a recessed rim within the frame, and the outer chamber is defined at least in part by the filter screen and an outer cover layer mounted on an outer rim of the frame. The inner chamber includes features that restrict the flow of bubbles, allowing more time for them to combine into larger bubbles that are weaker and for breaking the bubbles in the froth. In one example, the inner chamber includes inverted v-shaped features which may have a middle post to facilitate breaking of the bubbles. The size of the bubble-breaking features may increase with increasing height of the inner chamber. As froth is directed into the inner chamber, the bubbles are forced to travel through the inner chamber. As the bubbles are broken, the coalesced fluid passes through the filter screen and into the outer chamber.

As described above, froth may be found in many fluids. For example, in printing systems, a backpressure may be desirable in an ink printhead. To maintain this pressure, air is introduced into the printhead. The mixture of the ink and air generates froth within the printhead. While specific reference is made to froth in an ink printhead, such froth can exist in any fluid processing system. For example, some devices such as industrial cleaning devices use liquid detergent to clean components of the system. These devices similarly contain a froth layer due to the incorporation of air, surfactants, or other components.

Such froth can impact the functionality of the system. For example, in an ink system, froth may reduce the accuracy of certain sensors such as an ink-level gauge or a sensor that indicates that the system is out of ink. The accuracy of these sensors and gauges impacts user satisfaction, system performance, and system reliability. More specifically, the froth present in an ink supply could prematurely trigger an out-of-ink sensor. Such a premature triggering of the sensor could lead to the replacement of an ink supply prior to its exhaustion, which is an inefficient use of ink and may create an impression on the customer that an ink supply drains sooner than it actually does. In some cases, premature triggering of an ink sensor could also lead to failure of the printing system.

Some systems have implemented a batch froth dissipation system wherein froth accumulates and dissipates over time and is gravity-fed back into the system. However, this system relies on time to dissipate the froth, and a lag is accordingly introduced between froth accumulation and coalescence. Such a lag, in addition to being inefficient, also leads to erroneous fluid level readings.

Accordingly, the present disclosure describes example devices and methods for coalescing a frothy fluid into coalesced fluid and air. Specifically, the present disclosure describes a system that continuously, and not in a batched or periodic fashion, coalesces a frothy fluid. In so doing, the function of the corresponding system in general is improved, specifically the accuracy of system sensors is improved, which leads to improved system performance, increased customer satisfaction, and improved fluid efficiency.

Figure 2:
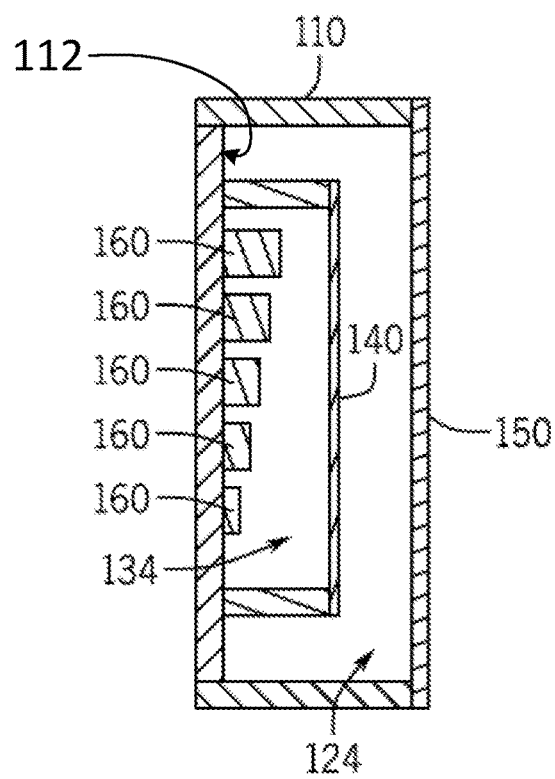
FIG. 2 is a cross-sectional view of the example defrothing device of FIG. 1 taken along 2-2.

Referring now to the figures, FIGS. 1 and 2 illustrate an example defrothing device 100. The example device 100 includes a frame 110 with various features formed therein. In the example illustrated in FIGS. 1 and 2, the frame 110 is generally in the shape of a rectangular box, but various other shapes are possible and are contemplated within the scope of the present disclosure. In various examples, the frame 110 may be formed of a molded plastic or various other materials. Various features of the frame are provided to facilitate coalescing of a froth directed into the frame 110.

In the example illustrated in FIGS. 1 and 2, the frame 110 is provided with a wall 112 on one side of the frame 110. The opposite side of the frame 110 is open and provided with an outer opening 120 defined by an outer rim 122 which substantially forms the perimeter of the outer opening 120. In the example of FIGS. 1 and 2, the outer rim 122 of the outer opening 120 is also the outer perimeter of the frame 110. In other examples, the outer rim 122 of the outer opening may be separate from the outer-most portion of the frame.

The example frame 110 of the example defrothing device 100 of FIGS. 1 and 2 further includes an inner opening 130 defined by an inner rim 132 which substantially forms the perimeter of the inner opening 130. The inner opening 130 of the example frame 110 is recessed from the outer opening 120, as most clearly illustrated in the cross-sectional view of FIG. 2. In this regard, the distance between the wall 112 of the frame 110 and the outer rim 122 is greater than the distance between the wall 112 and the inner rim 132.

As shown in the exploded view of FIG. 1 and the cross-sectional view of FIG. 2, a filter screen 140 is mounted on the perimeter of the inner opening 130 to form an inner chamber 134. In this regard, the filter screen 140 may be mounted to the inner rim 132 in any of a variety of manners. For example, the filter screen 140 may be attached by heat staking it the inner rim 132. Of course, other manners of attachment of the filter screen 140 are possible and are contemplated within the scope of the present disclosure.

The filter screen 140 may be formed of a variety of materials, including metal or plastic, for example. As described in greater detail below, the filter screen 140 may be used to dissipate bubbles in a froth that may be introduced into the inner chamber 134. In this regard, the filter screen 140 may include pores to allow coalesced fluid to pass therethrough but prevents froth (e.g., bubbles) from passing. The size, shape and distribution of the pores in the filter screen 140 may be selected based on a variety of factors such as the type of fluid and expected flow rate of the froth, for example. Similar factors may be used to select the size and shape of the inner chamber 134. For example, a larger and taller inner chamber 134 may be desirable for a higher flow rate of froth therethrough.

Referring again to FIGS. 1 and 2, the example defrothing device 100 is provided with a cover layer 150 mounted on the perimeter of the outer opening 120 to form an outer chamber 124. In this regard, the cover layer 150 may be mounted to the outer rim 122 in any of a variety of manners, such as by heat staking it the outer rim 122. Of course, other manners of attachment are possible and are contemplated within the scope of the present disclosure. The cover layer 150 may be formed of a variety of materials that prevent a fluid from passing therethrough. For example, the cover layer 150 may be a film formed of a metal or a plastic.

Thus, as most clearly illustrated in the cross-sectional view of FIG. 2, the inner chamber 134 is defined at least in part by the wall 112 of the frame 110 on a first side and the filter screen 140 on a second side, the second side being opposite the first side. Similarly, the outer chamber 124 is defined at least in part by the filter screen 140 on one side and the cover layer 150 on the opposite side. Thus, the filter screen 140 separates the inner chamber 134 and the outer chamber 124.

The example defrothing device 100 of FIGS. 1 and 2 is provided with a series of bubble-breaking features 160 positioned within the inner chamber 134. The bubble-breaking features 160 may also restrict the flow of bubbles, allowing more time for them to combine into larger bubbles that are weaker. In the example illustrated in FIGS. 1 and 2, the bubble-breaking features 160 are positioned along the depth (left to right in FIG. 1) and along the height (up to down in FIGS. 1 and 2) of the inner chamber 134. In various examples, the bubble-breaking features 160 are integrally formed with the frame 110. For example, the frame 110 may be molded with the bubble-breaking features 160 formed on the wall 112 of the frame 110.

In various examples, the size of the bubble-breaking features 160 may increase with the height of the inner chamber 134. As most clearly illustrated in FIG. 2, in the example defrothing device 100, the width of the bubble-breaking features 160 (e.g., the magnitude of protrusion from the wall 112) increases with height. Thus, as described in greater detail below, as froth is introduced into the bottom portion of the inner chamber 134 and travels upward, the bubble-breaking features 160 may progressively ensure breaking of smaller and smaller bubbles. In one example, the uppermost bubble-breaking features 160 are sized to provide a gap between the bubble-breaking feature 160 and the filter screen 140 that is no greater than the size of a single bubble. Thus, the gap between the uppermost bubble-breaking features 160 and the filter screen 140 is sized such that the bubbles are substantially in a single-wide formation.

Figure 3:
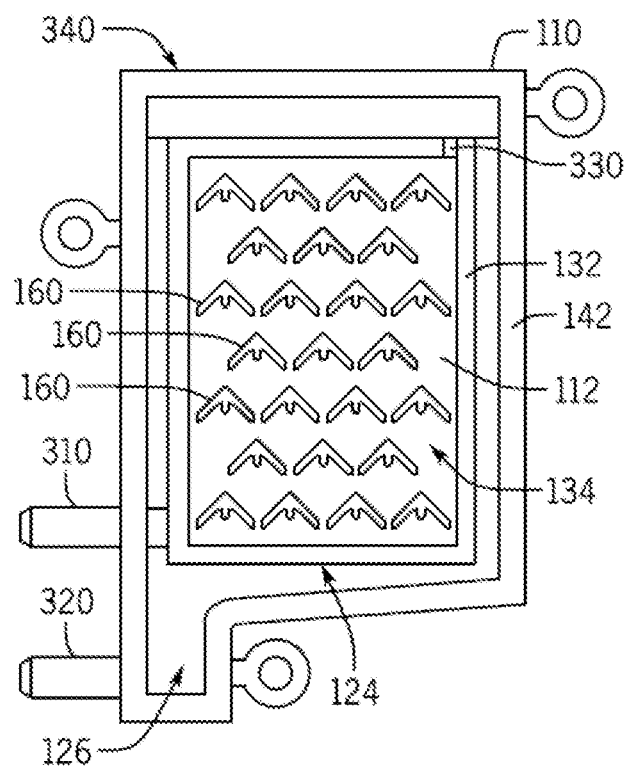
FIG. 3 is a plan view of the example defrothing device of FIG. 1 with the filter screen and the cover layer removed.

Referring now to FIG. 3, a plan view of the frame 110 of the defrothing device 100 of FIGS. 1 and 2 is illustrated. In this regard, FIG. 3 provides a view of the frame 110 with the filter screen 140 and the cover layer 150 removed. As most clearly illustrated in FIG. 3, the frame 110 is provided with an inlet port 310 through which froth may be introduced into the defrothing device 100. In this regard, the inlet port 310 extends from the outside of the frame 110 and into the inner chamber 134 which is formed when the filter screen (not shown in FIG. 3) is mounted to the inner rim 132. As illustrated in the example of FIG. 3, the inlet port is positioned near the bottom portion of the inner chamber 134. Thus, once froth is introduced into the inner chamber 134, the froth is forced to travel upward in the inner chamber 134.

The frame 110 is further provided with an outlet port 320 through which coalesced fluid may be directed out of the defrothing device 100 to, for example, a reservoir for the fluid. In this regard, the outlet port 320 extends from the outer chamber 124 (which is formed when the filter screen and the outer layer are mounted) and through the frame 110 to outside the frame. As illustrated in the example of FIG. 3, the outlet port is positioned near the bottom portion of the outer chamber 124. In the example illustrated in FIG. 3, the frame 110 is formed to provide a sump portion 126 of the outer chamber 124. Thus, as the coalesced fluid crosses the filter screen into the outer chamber, gravity causes the fluid to travel downward and into the sump portion 126. Accordingly, the outlet port 320 is located at the sump portion 126 of the outer chamber 124.

Referring again to FIG. 3, the frame 110 is provided with a vent 330 to allow air to escape the inner chamber 134. An additional vent 340 (most clearly illustrated in FIG. 1) to allow the air to escape from the defrothing device 100 to the atmosphere. Thus, as the froth is separated in the inner chamber 134 and the coalesced fluid passes through the filter screen 140 into the outer chamber 124, the remaining air may be vented from the inner chamber 134 through the vents 330, 340 to the atmosphere.

Figure 4:
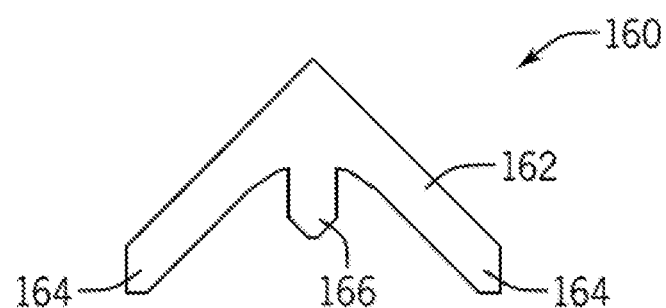
FIG. 4 is a detailed view of an example bubble-breaking feature.

Referring now to FIG. 4, a detailed view of an example bubble-breaking and/or restricting feature 160 is provided. In the illustrated example, the bubble-breaking feature 160 is formed in a chevron configuration. Thus, the example bubble-breaking feature 160 may be formed on the wall of a frame (e.g., wall 112 of the frame 110 described above) as an inverted v-shaped protrusion. As illustrated in FIG. 4, the inverted v-shaped configuration of the example bubble-breaking feature 160 includes two side protrusions 164 and a central post 166 to facilitate breaking of bubbles traveling in the upward direction.

Figure 5:
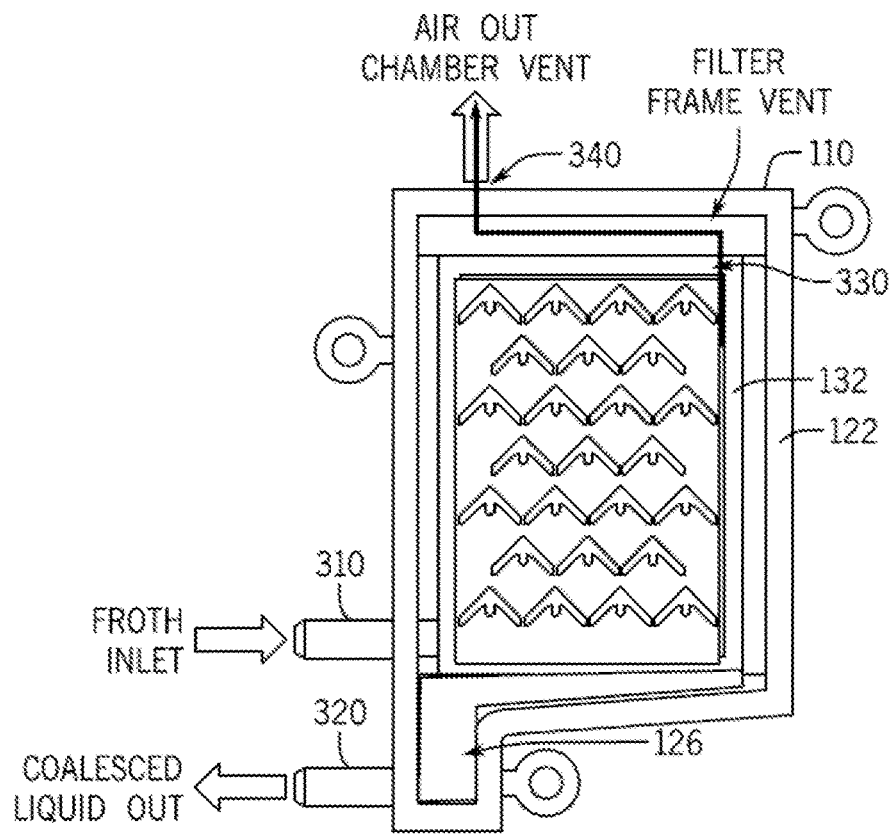
FIG. 5 is a plan view illustrating operation of the example defrothing device of FIG. 1.

Referring now to FIG. 5, a plan view of the example defrothing device 100 illustrates operation of the defrothing device 100. As described above, froth is introduced into the example defrothing device 100 through the inlet port 310 into the bottom portion of the inner chamber 134. As the froth travels upward within the inner chamber 134, the bubbles of the froth are broken at least in part by the bubble-breaking features 160. Additional breaking of the bubbles may result from abrading of the bubbles against the rough porous surface of the filter screen 140, causing rupture of the surface of the bubbles.

With breaking of the bubbles, the coalesced fluid passes through the filter screen (not shown in FIG. 5) and into the outer chamber. The coalesced fluid is collected in the sump portion 126 of the outer chamber and may be directed out of the defrothing device 100 through the outlet port 320. The air resulting from the breaking of the bubbles in the froth is vented thought the vents 330 and 340 to the atmosphere.

Figure 6:
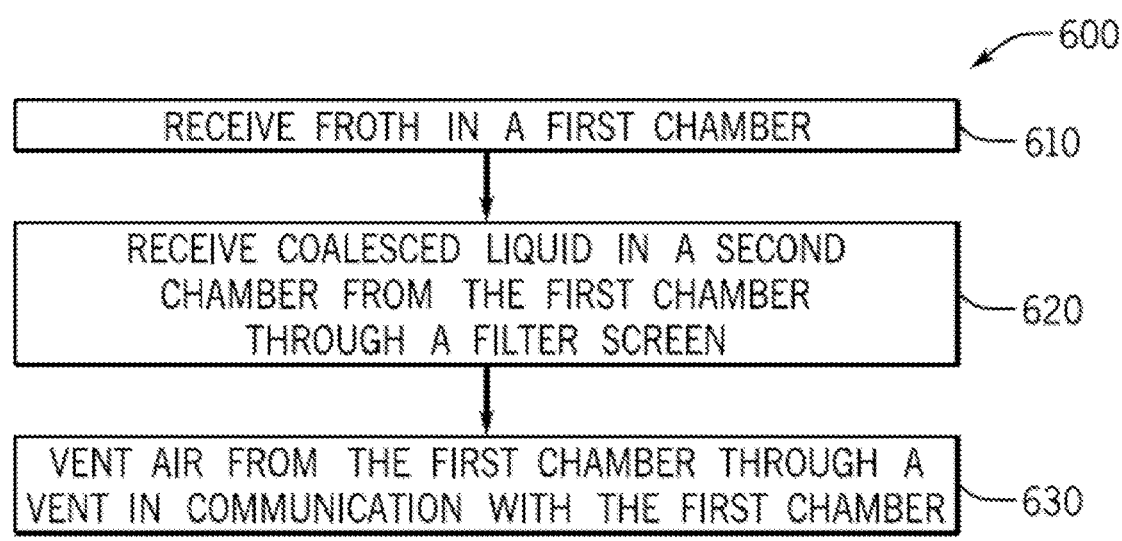
FIG. 6 is a flow chart illustrating an example process for processing of coalescing froth.

Referring now to FIG. 6, a flow chart illustrates an example method for froth coalescing. The example method 600 may be implemented in various devices, including the example devices described above with reference to FIGS. 1-5. In accordance with the example method 600, froth is received in a first chamber (block 600). The first chamber is provided with bubble-breaking features therein that are positioned along a depth and a height of the first chamber. For example, with reference to the example defrothing device 100 of FIGS. 1-5, froth may be received in the inner chamber 134 through the inlet port 310, and the inner chamber is provided with bubble-breaking features 160 positioned on the wall 112 of the frame 110.

In the example method 600, coalesced fluid from the froth is received in a second chamber from the first chamber through a filter screen (block 620). For example, as described above, the froth is separated into fluid and air by breaking of the bubbles. In the example defrothing device 100 of FIGS. 1-5, bubbles may be broken at least by the bubble-breaking features 160 provided in the inner chamber 134. The coalesced fluid passes through the filter screen 140 into the outer chamber 124.

In the example method 600, air is vented from the first chamber through a vent that is in communication with the first chamber (block 630). For example, with reference to the example defrothing device 100 of FIGS. 1-5, breaking of bubbles in the inner chamber 134 results in the separation of coalesced fluid and air. As noted above, the coalesced fluid is passed through the filter screen 140 into the outer chamber 124. The air is vented from the inner chamber 134 through the vents 330, 340 to the atmosphere.

Thus, in accordance with various examples described herein, defrothing devices can continuously process froth. The froth can be efficiently separated into coalesced fluid and air. The coalesced fluid can be directed to a reservoir for use, and the air can be vented to the atmosphere, for example.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A device, comprising:
    a frame having at least one outer opening and at least one inner opening recessed from the outer opening;
    at least one filter screen mounted on a perimeter of the at least one inner opening to form an inner chamber;
    at least one cover layer mounted on a perimeter of the at least one outer opening to form an outer chamber; and
    a series of bubble-breaking features positioned within the inner chamber, the bubble-breaking features being positioned along a depth and a height of the inner chamber,
    wherein the filter screen separates the inner chamber from the outer chamber, and
    wherein the filter screen prevents froth from crossing and allows coalesced fluid to cross into the outer chamber.

2. The device of claim 1, wherein the cover layer is formed of a film that prevents fluid from passing therethrough.

3. The device of claim 1, wherein the inner chamber is defined by the filter screen on a first side and a wall of the frame on a second side, the second side being opposite the first side.

4. The device of claim 3, wherein a gap in the inner chamber between the filter screen and at least one of the bubble-breaking features is sized to accommodate bubbles in a froth in the inner chamber such that the bubbles are substantially in a single-wide formation.

5. The device of claim 3, wherein the bubble-breaking features are formed on the wall of the frame.

6. The device of claim 5, wherein the bubble-breaking features increase in size with increasing height of the inner chamber.

7. The device of claim 1, wherein the bubble breaking features include an inverted v-shaped protrusion.

8. The device of claim 7, wherein the inverted v-shaped protrusion includes a middle post to facilitate breaking of bubbles in a froth.

9. The device of claim 1, further comprising:
    an inlet port extending through the frame and into the inner chamber;
    an outlet port extending from the outer chamber and through the frame; and
    an air vent at least in communication with the inner chamber.

10. The device of claim 9, wherein the inlet port is positioned near a bottom portion of the inner chamber, the outlet port is positioned near a bottom portion of the outer chamber, and the air vent is positioned near a top portion of the inner chamber.

11. The device of claim 9, wherein the air vent includes a labyrinth formed in the frame.

12. A device, comprising:
    a substantially rectangular housing having an outer rim along at least one open face;
    at least one recessed rim being recessed from the outer rim and within the housing, the recessed rim having a profile lying within a profile of the outer rim;
    a filter screen mounted on the at least one recessed rim, the filter screen to prevent froth from passing therethrough and to allow coalesced fluid from passing therethrough, the filter screen and the recessed rim defining an inner chamber;
    at least one cover layer mounted on the outer rim; and
    a series of bubble-breaking features positioned within the inner chamber, the bubble-breaking features being positioned along a depth and a height of the inner chamber.

13. The device of claim 12, wherein the housing is substantially rectangular.

14. The device of claim 12, wherein the filter screen separates the inner chamber from an outer chamber, the outer chamber being defined at least by the filter screen on a first side and the cover layer on a second side, the second side being opposite the first side.

15. A method, comprising:

receiving froth in a first chamber of a housing, the first chamber having bubble-breaking features therein, the bubble-breaking features being positioned along a depth and a height of the first chamber, the first chamber having a filter screen on at least on side;

receiving coalesced fluid through the filter screen in a second chamber, the second chamber being defined by the filter screen on a first side and a cover layer on a second side, the second side being opposite the first side; and venting air from the first chamber through a vent that is in communication with the first chamber.

\* \* \* \* \*